United States Patent
Schlüter

(10) Patent No.: US 6,520,063 B2
(45) Date of Patent: Feb. 18, 2003

(54) VACUUM BRAKE BOOSTER WITH MECHANICAL EMERGENCY BRAKING ASSISTANCE AND IMPROVED NOISE DAMPING

(75) Inventor: Peter Schlüter, Kammerforst (DE)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 10/072,542

(22) Filed: Feb. 8, 2002

(65) Prior Publication Data

US 2002/0121187 A1 Sep. 5, 2002

Related U.S. Application Data

(63) Continuation of application No. PCT/EP00/07747, filed on Aug. 9, 2000.

(30) Foreign Application Priority Data

Aug. 12, 1999 (DE) .......................................... 199 38 040

(51) Int. Cl.[7] .................................................. F15B 9/09
(52) U.S. Cl. ........................................ 91/367; 91/376 R
(58) Field of Search ................................ 91/376 R, 367

(56) References Cited

U.S. PATENT DOCUMENTS

| 5,479,844 A | 1/1996 | Heibel et al. | |
|---|---|---|---|
| 2001/0003947 A1 | 6/2001 | Schluter | ................. 91/376 R |
| 2001/0027717 A1 | 10/2001 | Schluter | |

FOREIGN PATENT DOCUMENTS

| DE | 19529387 A1 | 2/1997 | |
|---|---|---|---|
| DE | 19802846 A1 | 8/1999 | |
| DE | 19850478 A1 | 5/2000 | |
| JP | 9-175373 | 7/1997 | ............... 91/376 R |
| WO | 00/07862 | 2/2000 | |

*Primary Examiner*—F. Daniel Lopez
(74) *Attorney, Agent, or Firm*—MacMillan, Sobanski & Todd, LLC

(57) ABSTRACT

A vacuum brake booster (10) has a vacuum chamber (18) and a working chamber (20), which are separated in a pressure-proof manner from one another by a movable wall (16). A control valve (22) having a housing (24), which is workingly coupled to the movable wall (16) and in which a first valve seat (64) is disposed, in order to achieve a pressure difference at the movable wall (16) controls the supply of at least atmospheric pressure to the working chamber (20) in dependence upon the displacement of an input element (26), which is coupled to the first valve seat (64), of the brake booster (10). Disposed in the control valve housing (24) is an armature (38), which cooperates with a permanent magnet (40) and which is coupled on the one hand to the input element (26) in actuating direction and on the other hand to the first valve seat (64). A spring (42) biases the armature (38) counter to actuating direction and in the starting position of the control valve (22) holds the armature (38) at a first distance from the permanent magnet (40). The armature (38) in the course of a movement towards the permanent magnet (40), when it is less than a previously fixed second distance, which is less than the first distance, away from the permanent magnet (40), is pulled counter to the force exerted by the spring (42) upon the armature (38) and with simultaneous cancellation of its, in actuating direction, rigid coupling to the input element (26) into abutment with the permanent magnet (40). To dampen undesirable impact noises, the spring (42), which biases the armature (38) counter to actuating direction, is mechanically coupled to the input element in such a way as to cushion the return stroke motion of the input element (26), which follows a detaching of the armature (38) from the permanent magnet (40), before the input element (26) has completed its maximum possible return stroke relative to the control valve housing (24).

18 Claims, 3 Drawing Sheets

VACUUM BRAKE BOOSTER WITH MECHANICAL EMERGENCY BRAKING ASSISTANCE AND IMPROVED NOISE DAMPING

CROSS REFERENCE TO RELATED APPLICATIONS

This application is a continuation of International Application No. PCT/EP00/07747 filed Aug. 9, 2000, which claims priority to German Patent Application No. 19938040.6 filed Aug. 12, 1999.

BACKGROUND OF THE INVENTION

The invention relates to vacuum brake boosters.

Vacuum brake boosters as such have been known for some time and millions of them are in use for boosting the actuating forces of a vehicle hydraulic brake system and hence keeping said forces at a comfortably low level for the driver of a vehicle.

Recently, there has been a growing tendency to equip vacuum brake boosters with so-called brake assist. By said term is usually meant a system, which in an emergency braking situation, given substantially the same actuating force, may provide the driver with increased braking power. Systems of said type were developed because investigations revealed that the majority of vehicle users in an emergency braking situation do not press as hard on the brake pedal as is necessary to achieve the maximum braking power. The stopping distance of the vehicle is therefore longer than it need be. Systems of said type already in production use an electromagnetically actuable brake booster combined with a device capable of determining the actuating speed of the brake pedal. If said device detects an actuating speed above a defined threshold value, it is assumed that an emergency braking situation exists and the brake booster is set by means of the electromagnetic actuating device to maximum output, i.e. provides its maximum boosting power.

Brake boosters with an electromagnetic actuating facility are however too expensive for motor vehcles in the low- to medium-price category, which is why solutions have been developed which provide a brake assist function without an electromagnetically actuable control valve. The brake assist function in said solutions is realized in that, after a defined cut—in threshold is exceeded, an armature, which is rigidly coupled to a valve seat controlling the supply of atmospheric pressuire into the brake booster (atmospheric seal seat), is pulled into abutment with a permanent magnet and then holds the said valve seat open until the driver by means of a fixed return stroke of the brake pedal detaches the armature from the permanent magnet.

With said solutions, relatively loud and hence intrusive noises may occur when the brake assist function cuts out, i.e. when the armature pulls away from the permanent magnet. Said noises may occur because the armature, after detaching from the permanent magnet, returns almost immediately into its starting position and therefore, on the one hand, closes the atmospheric seal seat and, on the other hand, opens the connection of the working chamber to the vacuum chamber, with the result that the power assistance generated by the brake booster ceases almost instantaneously. All of the forces, which a master cylinder connected to the brake booster exerts because of the hydraulic pressure generated therein, therefore react fully upon the input element of the brake booster and upon components workingly connected to the input element. Said hydraulic reaction forces are added to the spring forces, which reset the actuating components of the brake booster, resulting in a hard impact of said parts against the corresponding end stops, which causes the said undesirable noises.

SUMMARY OF THE INVENTION

The object of the invention is to provide a vacuum brake booster of the described type, i.e. having a brake assist function capable of being cut in and out without electromagnetic assistance, in which said undesirable impact noises no longer occur or at any rate are no longer an intrusive phenomenon.

Said object is achieved according to the invention by a vacuum brake booster having the features indicated in claim 1.

In a vacuum brake booster of the required type a permanent magnet and an armature cooperating therewith are disposed in the housing of the control valve. The armature is rigidly coupled, on the one hand, to the input element of the brake booster and/or of the control valve and, on the other hand, to the first valve seat (atmospheric seal seat). The armature, which is movable to and fro relative to the permanent magnet, is spring-biased counter to actuating direction and in the starting position of the control valve is held at a first distance from the permanent magnet, preferably by means of the spring bias counter to actuating direction. In the course of a movement towards the permanent magnet which occurs upon actuation of the brake booster, the armature may move until it is less than a previously fixed, second distance away from the permanent magnet, which is smaller than the first distance. The armature, once it is less than said distance away, is pulled counter to the spring bias force acting upon the armature and with simultaneous cancellation of its, in actuating direction, rigid coupling to the input element by the permanent magnet into abutment with the permanent magnet. Thus, even when the actuating force introduced into the brake booster does not increase, the first valve seat coupled to the armature remains fully open (brake assist function) so that the brake booster builds up the highest possible pressure difference between its vacuum chamber and its working chamber, i.e. the brake booster provides its maximum boosting power.

According to the invention, the return stroke motion of the input element and/or of control valve components workingly connected to the input element, which follows a detaching of the armature from the permanent magnet, is cushioned before the input element has completed its maximum possible return stroke relative to the control valve housing. Said cushioning or damping of the return stroke motion is achieved in the present invention by the same spring, which biases the armature counter to actuating direction. To said end, said armature-restoring spring is coupled to the input element in such a way that the latter runs onto the spring only after detachment of the armature from the permanent magnet, i.e. after a cut-out of the brake assist function, and indeed before the input element has completed its return stroke. In all other operating states the spring is supported against a housing-fixed component and does not impede the return motion of the input element and/or of components connected to the latter. According to the invention, therefore, the energy introduced into the input element after cut-out of the brake assist function is taken up at least partially by the said spring, thereby preventing a metallically hard impact of the input element and/or of components connected thereto against parts of the control valve housing, which delimit the return stroke.

In a preferred form of construction of the vacuum brake booster according to the invention, a transmission piston, which is rigidly coupled to the input element, is provided in the region of its end remote from the input element with an annular groove, which has a fixed axial extension. Guided in an axially displaceable manner in said annular groove is an annular disk, against which the end of the armature-restoring spring remote from the armature is supported. The annular groove is so positioned and its axial extension is so dimensioned that the annular disk may come into contact with the edge of the annular groove remote from the input element only after detaching of the armature from the permanent magnet, i.e. only after a cut-out of the brake assist function.

The last-mentioned form of construction is preferably developed in such a way that the annular disk, when it is not in contact with the edge of the annular groove remote from the input element—i.e. in the majority of all of the operating states, is pressed by the armature-restoring spring towards a cover of the control valve housing. In said form of construction, the cover is the above-mentioned housing-fixed component, against which the spring is supported.

For further damping of possible metal impact noises, the annular disk at the side, which after cut-out of the brake assist function comes into contact with the edge of the annular groove, is preferably provided with a shock-absorbing elastomeric layer. With said elastomeric layer the annular disk is supported against the housing-fixed component in the other operating states.

In preferred embodiments of the vacuum brake booster according to the invention, the said second distance is defined by the magnitude of the spring bias acting upon the armature. When the spring bias acting upon the armature is small, this means that the said second distance is relatively large, i.e. the threshold, which has to be exceeded in order to trigger the brake assist function, is relatively low. The reverse is the case when the spring bias acting upon the armature is large. Thus, through suitable selection of the spring bias acting upon the armature and of the said first distance it is possible to define a trigger threshold, which on the one hand avoids unwanted full braking operations but on the other hand may also, if need be, still be reliably overcome by less powerful drivers.

In preferred forms of construction of the vacuum brake booster according to the invention, the first valve seat of the control valve, which controls the ventilation of the working chamber, is rigidly coupled in actuating direction by the armature to the input element. The first valve seat may however also be actuated directly by the input element. In all forms of construction of the vacuum brake booster according to the invention, the first valve seat is preferably formed on an, in particular sleeve-shaped, extension rigidly connected to the armature. In said manner each movement of the armature is transmitted without play to the first valve seat.

When the first valve seat is formed on an extension rigidly connected to the armature, a locking bar rigidly coupled to the input element preferably engages into a recess of the extension, in which the locking bar in the direction of displacement of the input element has a play, which is smaller than the maximum possible actuating stroke of the input element. Thus, the locking bar rigidly coupled to the input element may during the return motion of the input element, i.e. during release of the brake, detach the extension rigidly connected to the armature optionally from the permanent magnet, i.e. cut out the brake assist function. The exact shape of the recess in the extension is in said case unimportant, it merely being crucial that the locking bar or another part rigidly connected to the input element still during the return motion comes into positive engagement with the extension.

In all forms of construction of the vacuum brake booster according to the invention, the input element is preferably spring-biased counter to actuating direction. Upon release of the brake, said spring bias returns the input element into the starting position. In a constructionally advantageous manner said spring bias of the input element in the course of the latter's return into the starting position is also utilized to detach the armature from the permanent magnet, e.g. by means of the previously mentioned locking bar, which engages into a recess of the extension coupled to the armature.

To reduce or eliminate impact noises which may occur as a result of the return stroke motion of the armature which follows a detaching of the armature from the permanent magnet, in all forms of construction of the vacuum brake booster according to the invention said return stroke motion is preferably damped by means of an elastomeric element, which is disposed between the armature and the stop face, towards which the armature moves during its return stroke motion. In a simple yet effective form of construction, the elastomeric element is an O-ring.

In preferred embodiments of the vacuum brake booster according to the invention, the permanent magnet is guided in a displaceable manner in the control valve housing and is preferably moreover counter to actuating direction spring-biased towards a stop. Such a form of construction has the advantage that, when the armature in the course of a rapid actuation of the brake booster has moved to a distance less than the previously defined, second distance away from the permanent magnet and has consequently been pulled into abutment with the permanent magnet and the actuating force exerted upon the input element is further increased, instead of said actuating force being transmitted from the input element via the unit comprising armature and permanent magnet to the control valve housing and from there to a master cylinder disposed downstream of the vacuum brake booster, an increased actuating force exerted upon the input element is transmitted directly from the input element to the downstream master cylinder. The magnetic device, in particular the armature, the permanent magnet and components receiving the latter, may therefore be of a less stable design. If for all conceivable actuating situations the coming of the magnetic device into a load-transmitting state is to be avoided, then the permanent magnet has to be displaceable in actuating direction relative to the control valve housing by an amount which is greater than the maximum possible actuating stroke of the input element minus the said first distance.

In order, in the event that a stop is provided for the permanent magnet, to prevent manufacturing tolerances from leading to a skew position of the contact surface of the permanent magnet relative to the contact surface of the armature, which in turn may lead to a canting and hence possibly to a jamming of the armature and/or of the permanent magnet, in preferred embodiments the stop for the permanent magnet and/or the contact surface, which is formed on the permanent magnet (or the mounting of the latter) and cooperates with the previously mentioned stop, is of a crowned configuration. Furthermore, there is a radial play between the permanent magnet and/or its mounting and the control valve housing. In said manner, the permanent magnet may always be aligned correctly relative to the armature. Alternatively, the armature itself may be refined in a way that allows a specific swivelling of its contact surface to compensate the said skew position.

Although the permanent magnet may be spring-biased in any manner towards the stop, an, as a whole, annular spring element comprising a plurality of spring ring segments is preferentially used to bias the permanent magnet counter to actuating direction. Such a spring element has a very short axial length and therefore reduces the overall length of the control valve equipped with a magnetic device according to the invention.

According to a preferred development of the vacuum brake booster according to the invention with a displaceable permanent magnet, the armature comprises a base and a magnetic plate, which is connected to the latter and faces the permanent magnet. Thus, only the magnetic plate need be made of a material which is attracted by the permanent magnet, while the base of the armature may be made of non-magnetic material, e.g. a plastics material. If the armature is hollow-cylindrical, then the magnetic plate is preferably annular.

BRIEF DESCRIPTION OF THE DRAWINGS

FIG. 1 shows a brake booster 10 having a housing 14, which is formed from sheet-metal shells 12 and the interior of which is subdivided by a movable wall 16 into a vacuum chamber 18 and a working chamber 20.

DETAILED DESCRIPTION OF THE INVENTION

Figure 1:
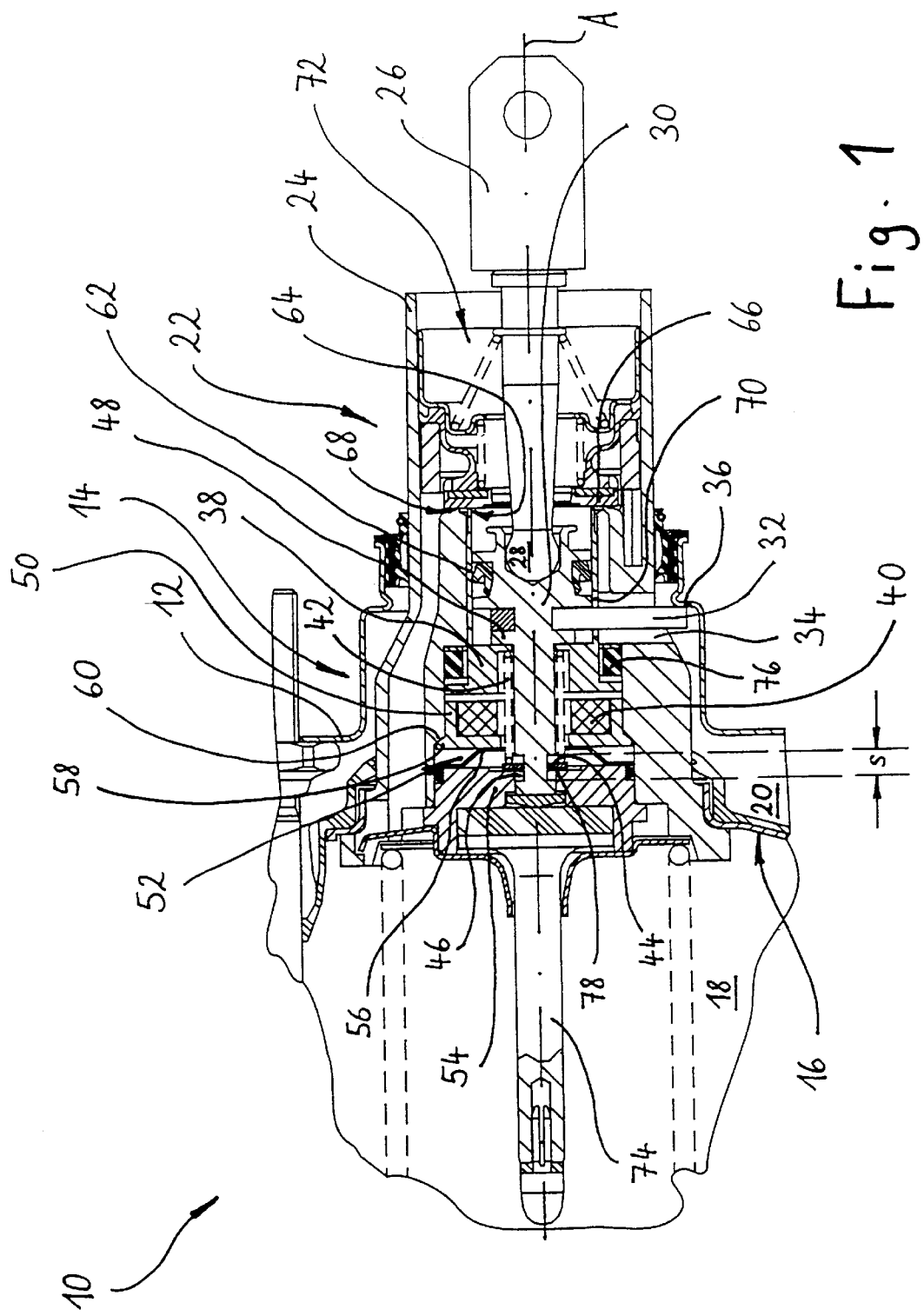
FIG. 1 a longitudinal section through the presently relevant control valve region of an embodiment of a vacuum brake booster according to the invention in its neutral position, FIG. 2 the view according to FIG. 1 in an actuating position, in which the so-called brake assist function is switched on, and FIG. 3 the view according to FIG. 1 immediately after cut-out of the brake assist function.

During operation of the brake booster 10 the vacuum chamber 18 is in constant communication with a vacuum source, e.g. with the intake tract of an i.c. engine or with a vacuum pump. A control valve 22 with a housing 24 is provided in order to establish either a connection of the working chamber 20 to the vacuum chamber 18, so that the working chamber 20 may be evacuated, or a connection between the evacuated working chamber 20 and the ambient atmosphere, i.e. the ambient pressure. The movable wall 16 is workingly coupled to the control valve housing 24.

The brake booster 10 is actuated by means of a rod-shaped input element 26, which is spring-biased into its starting position, projects along an axis A into the control valve housing 24 and is fastened by its one, spherically designed end 28 in a transmission piston 30.

Rigidly connected to the transmission piston 30 is a locking bar 32, which extends at right angles to the axis A away from the transmission piston 30 and through a channel 34 formed in the control valve housing 24. In the position shown in FIG. 1, the locking bar 32 rests against a stop 36 of the brake booster housing 14, which stop defines the inoperative position of the control valve 22, i.e. the relative position of all components of the control valve 22, which is adopted by said components in the non-actuated state of the brake booster 10. The side walls of the channel 34 restrict the mobility of the locking bar 32 along the axis A, i.e. the maximum stroke of the locking bar 32 along the axis A is determined by the distance apart of the side walls of the channel 34.

The transmission piston 30 penetrates a hollow-cylindrical armature 38 and an annular permanent magnet 40, which are both arranged concentrically with said piston and are both guided in a corresponding bore of the control valve housing 24.

The armature 38 cooperating with the permanent magnet 40 is displaceable along the axis A. A compression spring 42, which is disposed radially between the permanent magnet 40 and/or the armature 38 and the transmission piston 30 and of which one end is supported against an annular disk 44, which is guided in an axially displaceable manner in an annular groove 46 of the transmission piston 30, and the other end is supported against the armature 38, spring-biases the armature 38 counter to actuating direction and towards an annular collar 48 formed on the transmission piston 30. The compression spring 42 ensures that in the neutral position of the control valve 22 there is an axial air gap between the armature 38 and the permanent magnet 40, i.e. that the armature 38 is held at a defined first distance from the permanent magnet 40.

The permanent magnet 40 itself is accommodated in a guide body 50, which is spring-biased counter to actuating direction by an annular spring element 52, which is supported against a cover 54 of the control valve housing 24. The spring element 52 comprises a plurality of tongue-shaped, interconnected spring ring segments 56 and therefore has a very short overall axial length.

For positioning the permanent magnet 40 relative to the armature 38, the guide body 50 is provided with a radially outwardly projecting collar 58, which cooperates with a corresponding step 60 in the control valve housing 24. The spring element 52 presses the collar 58 against the step 60. To avoid a skew position of the permanent magnet 40 relative to the armature 38 caused by manufacturing tolerances, at least one of the cooperating contact surfaces of the collar 58 and the housing step 60 is of a crowned construction, and between the guide body 50 and the control valve housing 24 there is moreover a slight radial play, which because of the crowned configuration of the contact surface(s) enables the guide body 50 always to be aligned relative to the armature 38 in such a way that the mutual contact surfaces of the armature 38 and the permanent magnet 40 are plane-parallel to one another.

Connected rigidly to the armature 38 at its side facing the input element 26 is a sleeve-shaped extension 62, on the free end of which a first annular valve seat 64 of the control valve 22 is formed. The first valve seat 64 cooperates with a likewise annular valve sealing element 66, which is spring-biased towards it, and may control the connection between the ambient atmosphere and the working chamber 20 of the brake booster 10.

Formed radially outside of and concentrically with the first valve seat 48 and at the inside of the control valve housing 24 is a second annular valve seat 68 of the control valve 22, which likewise cooperates with the valve sealing element 66 and which may control the connection between the vacuum chamber 18 and the working chamber 20 of the brake booster 10.

As illustrated, the locking bar 32 projects through a recess 70 of the sleeve-shaped extension 62. In said recess 70 the locking bar 32 in the direction of the axis A has a play, which is smaller than the maximum possible stroke of the locking bar 32 in the channel 34.

Figure 2:
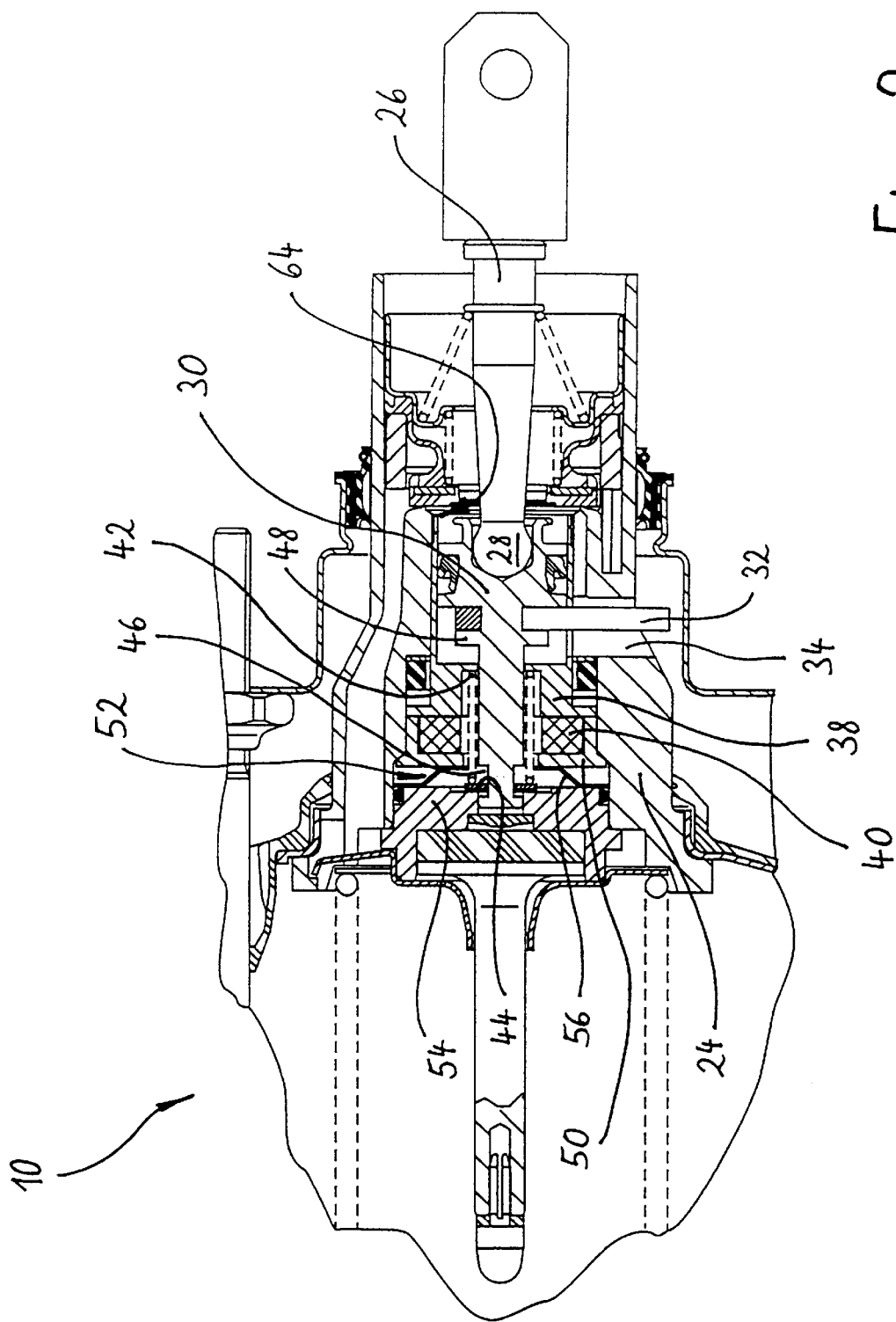
Figure 3:
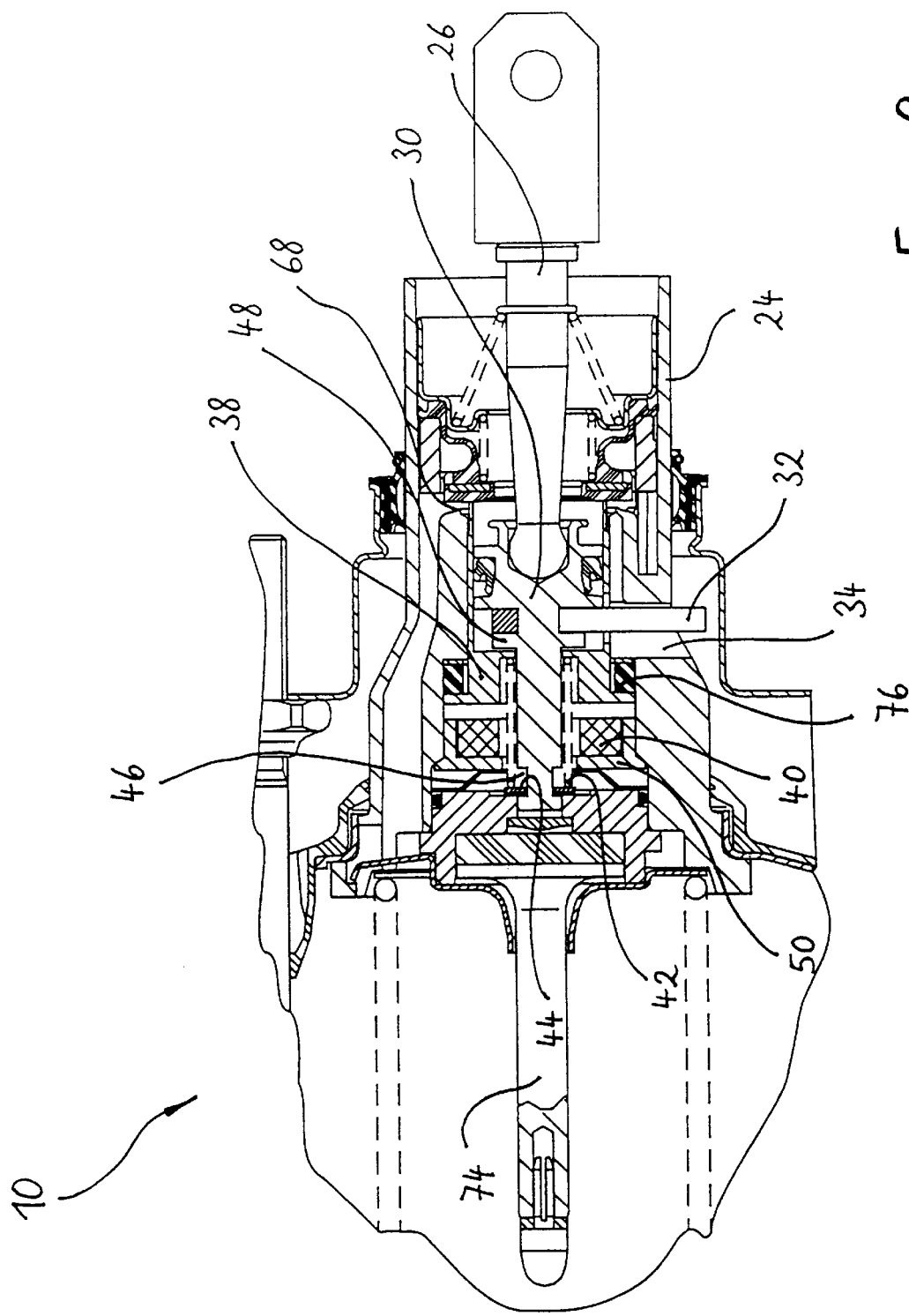

There now follows a detailed functional description of the brake booster 10 with reference to FIGS. 1 to 3. An actuation of the brake booster 10 displaces th e input element 26 into the brake booster 10 and/or the control valve 22, i.e. in the drawings to the left. Said displacement of the input element 26 is transmitted to the transmission piston 30 and from the latter, via its annular collar 48, to the armature 38.

The effect of the displacement of the armature 38 is that the first valve seat 64 formed on the hollow-cylindrical extension 62 is lifted off the valve sealing element 66, with the result that ambient air may pass through a channel 72 surrounding the input element 26, past the open valve seat 64, through the channel 34 formed in the control valve housing 24 and into the working chamber 20. At the movable wall 16 a pressure difference then arises and the resulting force is transmitted from the movable wall 16 to the control valve housing 24, which delivers said force by means of a force output plunger 74 to a master cylinder, which is not shown here.

The first valve seat 64 of the control valve 22 is therefore in dependence upon the displacement of the input element 26 relative to the control valve housing 24 opened to a greater or lesser extent, so that a correspondingly increasing boosting force of the brake booster 10 arises, which results from the pressure difference effective in each case at the movable wall 16.

During conventional service brake operations, which here are referred to as normal braking operations, the input element 26 and hence also the armature 38 are displaced only relatively slightly in actuating direction. The spring 42 is so designed that the restoring force, which it exerts upon the armature 38, during such normal braking operations is greater than the force of the permanent magnet 40 which attempts to pull the armature 38 in actuating direction, i.e. in the drawings to the left. Thus, during a normal braking operation the first valve seat 64 is rigidly coupled to the input element 26 not only in actuating direction (by the transmission piston 30, its annular collar 48 as well as the armature 38 and its sleeve-shaped extension 62) but also counter to actuating direction (by the sleeve-shaped extension 62 connected to the armature 38, the armature 38 pressed by the spring 42 against the annular collar 48, and the transmission piston 30). Each displacement of the input element 26 is accordingly transmitted instantaneously to the first valve seat 64.

If an actuating force applied initially to the input element 26 in the course of a normal braking operation is not increased, the valve sealing element 66 in the course of displacement of the control valve housing 24 comes into contact with the first valve seat 64 again, so that the air supply into the working chamber 20 is interrupted (position of equilibrium, both valve seats 64 and 68 closed).

However, when the input element 26 is actuated quickly and with a relatively large stroke, such as is typical of panic braking (emergency braking operation), the armature 38 moves closer towards the permanent magnet 40 so that, when the armature 38 is less than a second distance, which is smaller than the previously mentioned first distance, away from the permanent magnet 40, the force of the spring 42 is no longer sufficient to keep the armature 38 away from the permanent magnet 40. Rather, the force exerted by the permanent magnet 40 upon the armature 38 then predominates and the latter moves into abutment with the permanent magnet 40 (brake assist function, see FIG. 2). The maximum possible opening cross section of the first valve seat 64 is thereby achieved and ambient air flows into the working chamber 20 until the maximum possible differential pressure and hence the maximum possible boosting force of the brake booster 10 are achieved (so-called saturation point of the brake booster).

Between the end face of the guide body 50 remote from the input element 26 and the base of the cover 54 there is an axial clearance. The permanent magnet 40 accommodated in the guide body 50 may therefore be displaced counter to the force of the spring element 52 out of the position shown in FIG. 1 in actuating direction. The previously mentioned clearance is selected in such a way that the guide body 50, even when the input element 26 is actuated quickly and with great force, does not come into contact with the base of the cover 54. The guide body 50 and the permanent magnet 40 fixed therein need not therefore transmit any forces from the input element 26 to the control valve housing 24.

From the above description it is clear that ultimately it is the spring 42 which fixes the trigger threshold of the brake assist function. Said trigger threshold should not be set too low, otherwise unwanted full braking operations might occur, nor however should it be set too high if the desired triggering of the brake assist function during an emergency braking operation is to be achieved also in the case of a less powerful driver.

Since in the course of the brake assist function the armature 38, by coming into abutment with the permanent magnet 40, has detached itself from the annular collar 48 of the transmission piston 30, the first valve seat 64 is uncoupled from the input element 26 and therefore remains open even if a driver operating the brake booster 10 in the further course of the emergency braking operation is no longer capable of fully summoning up the necessary input force. In other words, even if the input element 26 in the further course of the emergency braking operation because of the then arising high reaction forces shifts slightly counter to actuating direction, this does not lead to closing of the first valve seat 64 because said restoring motion of the input element 26 is not transmitted to the first valve seat 64.

It is only when the return stroke of the input element 26 is large enough for the locking bar 32 to come into contact with the, in the drawings, right edge of the recess 70 of the sleeve-shaped extension 62 that the restoring force acting upon the input element 26 is transmitted also to the armature 38 and is sufficient to detach the armature 38 from the permanent magnet 40. The first valve seat 64 then comes into contact with the valve sealing element 66 and displaces the latter counter to actuating direction, with the result that the second valve seat 68 is opened and a connection is established between the working chamber 20 and the vacuum chamber 18 (see FIG. 3). The working chamber 20 is therefore evacuated and the starting state shown in FIG. 1 is reattained.

To dampen the return motion of the armature 38 after its detachment from the permanent magnet 40, an O-ring 76 made of elastomeric material is disposed in the control valve housing 24. Furthermore, in order during the return motion of the input element 26 to prevent a hard and accordingly loud impact of the locking bar 32 against the, in the drawings, right edge of the channel 34, the position and axial extension s of the annular groove 46 in the transmission piston 30 are selected in such a way that the left edge of the annular groove 46 runs onto the annular disk 44, which is normally supported against the cover 54, before the locking bar 32 has reached the right edge of the channel 34. The further return motion of the input element 26 and/or of the transmission piston 30 coupled thereto is then damped by the compressing spring 42, thereby preventing a hard impact of the locking bar 32 against the wall of the channel 34.

In order also to prevent intrusive noises from occurring when the transmission piston 30 runs onto the annular disk 44, the side of the annular disk 44 facing the cover 54 is coated with an elastomeric layer 78, which has a shock-absorbing effect.

The axial extension s of the annular groove 46 is selected in such a way that during normal braking operations the right edge of the annular groove 46 does not have a restricting effect upon the actuating stroke of the transmission piston 30.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Vacuum brake booster, comprising
   a vacuum chamber and a working chamber separated in a pressure-proof manner from one another by a movable wall, and
   a control valve having a housing, which is workingly coupled to the movable wall and in which is disposed a first valve seat, which to achieve a pressure difference at the movable wall is capable of controlling the supply of at least atmospheric pressure to the working chamber in dependence upon the displacement of an input element, which is coupled to the first valve seat, of the brake booster,
   an armature, which is disposed in the control valve housing and cooperates with a permanent magnet and which is selectively coupled on the one hand to the input element in actuating direction and on the other hand to the first valve seat, wherein
      a spring biases the armature counter to actuating direction and in the starting position of the control valve holds the armature at a first distance from the permanent magnet, and wherein
      the armature in the course of a movement towards the permanent magnet, when it is less than a previously fixed, second distance, which is less than the first distance, away from the permanent magnet, is pulled counter to the force exerted by the spring upon the armature and with simultaneous uncoupling, in actuating direction, to the input element into abutment with the permanent magnet,
   characterized in that
      the spring, which biases the armature counter to actuating direction, selectively is selectively mechanically coupled to the input element in such a way as to brake the return stroke motion of the input element, which follows a detaching of the armature from the permanent magnet, before the input element has completed its maximum possible return stroke relative to the control valve housing.

2. Vacuum brake booster according to claim 1,
   characterized in that a transmission piston, which is rigidly coupled to the input element, has in the region of its end remote from the input element an annular groove with a fixed axial extension, in which an annular disk, against which the end of the spring remote from the armature is supported, is guided in an axially displaceable manner, wherein the annular groove with its axial extension is so dimensioned and positioned that the annular disk comes into contact with the edge of the annular groove remote from the input element only after detaching of the armature from the permanent magnet.

3. Vacuum brake booster according to claim 2,
   characterized in that the annular disk, when it is not in contact with the edge of the annular groove remote from the input element, is pressed by the spring towards a cover of the control valve housing.

4. Vacuum brake booster according to claim 2,
   characterized in that the annular disk at its side, which faces the edge of the annular groove remote from the input element, is provided with a shock-absorbing elastomeric layer.

5. Vacuum brake booster according to claim 1,
   characterized in that the said second distance is defined by the magnitude of the force exerted by the spring upon the armature.

6. Vacuum brake booster according to claim 1,
   characterized in that the first valve seat is selectively coupled in actuating direction by the armature to the input element.

7. Vacuum brake booster according to claim 1,
   characterized in that the first valve seat is formed on an extension, rigidly connected to the armature.

8. Vacuum brake booster according to claim 7,
   characterized in that selectively connected to the input element is a locking bar, which engages into a recess of the extension, on which the first valve seat is formed, and that the play of the locking bar in said recess in the direction of displacement of the input element is smaller than the maximum possible actuating stroke of the input element.

9. Vacuum brake booster according to claim 7, characterized in that the extension is sleeve-shaped.

10. Vacuum brake booster according to claim 1,
    characterized in that the input element is spring-biased counter to actuating direction.

11. Vacuum brake booster according to claim 1,
    characterized in that the permanent magnet is guided in a displaceable manner in the control valve housing.

12. Vacuum brake booster according to claim 11,
    characterized in that the permanent magnet is spring-biased counter to actuating direction towards a stop.

13. Vacuum brake booster according to claim 12,
    characterized in that at least one of the stop and a contact surface, which cooperates with the stop and is associated with the permanent magnet is of a crowned configuration, and that there is a radial play between the permanent magnet and/or its mounting and the control valve housing.

14. Vacuum brake booster according to claim 11,
    characterized in that an annular spring element comprising a plurality of spring ring segments biases the permanent magnet counter to actuating direction.

15. Vacuum brake booster according to claim 11,
    characterized in that the permanent magnet is displaceable in actuating direction relative to the control valve housing by an amount which is greater than the maximum possible actuating stroke of the input element minus the said first distance.

16. Vacuum brake booster according to claim 1,
    characterized in that the armature comprises an annular base, to which is connected a magnetic plate, which faces the permanent magnet.

17. Vacuum brake booster according to claim 1,
    characterized in that the return stroke motion of the armature, which follows a detaching from the permanent magnet is damped by an elastomeric element.

18. Vacuum brake booster according to claim 10, characterized in that the elastomeric element is an O-ring.

* * * * *